United States Patent
Hotta et al.

(10) Patent No.: US 8,928,749 B2
(45) Date of Patent: Jan. 6, 2015

(54) POSITION MEASURING SYSTEM, PROCESSING DEVICE FOR POSITION MEASUREMENT, PROCESSING METHOD FOR POSITION MEASUREMENT, AND COMPUTER READABLE MEDIUM

(75) Inventors: Hiroyuki Hotta, Ashigarakami-gun (JP); Kazutoshi Yatsuda, Ashigarakami-gun (JP); Yasuyuki Saguchi, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 904 days.

(21) Appl. No.: 12/619,555

(22) Filed: Nov. 16, 2009

(65) Prior Publication Data

US 2010/0328451 A1 Dec. 30, 2010

(30) Foreign Application Priority Data

Jun. 24, 2009 (JP) ................. 2009-150364

(51) Int. Cl.
*H04N 7/18* (2006.01)
*G01B 11/03* (2006.01)
*G06T 7/00* (2006.01)

(52) U.S. Cl.
CPC .............. *G01B 11/03* (2013.01); *G06T 7/0042* (2013.01); *G06T 2207/10004* (2013.01); *G06T 2207/30204* (2013.01)
USPC ........................................................ 348/135

(58) Field of Classification Search
CPC ..................... G01B 11/03; G06T 2207/10004; G06T 2207/30204; G06T 7/0042
USPC ........................................................ 348/135
See application file for complete search history.

(56) References Cited

U.S. PATENT DOCUMENTS

| | | | |
|---|---|---|---|
| 5,791,351 A * | 8/1998 | Curchod ........................ | 600/595 |
| 6,112,113 A | 8/2000 | Van Der Brug et al. | |
| 6,724,930 B1 * | 4/2004 | Kosaka et al. ................ | 382/154 |
| 6,973,202 B2 | 12/2005 | Mostafavi | |

(Continued)

FOREIGN PATENT DOCUMENTS

| | | |
|---|---|---|
| JP | 06-028018 A | 2/1994 |
| JP | 2001-236520 A | 8/2001 |

(Continued)

OTHER PUBLICATIONS

Japanese Office Action, dated Jul. 2, 2013, issued in counterpart Japanese Patent Application No. 2009-150364.

(Continued)

*Primary Examiner* — Anner Holder
(74) *Attorney, Agent, or Firm* — Sughrue Mion, PLLC

(57) ABSTRACT

A position measuring system includes a marker set having three or more basic markers that are known in positional relation and attached to a second area of an object which contains a first area having an acting portion and the second area continuous with the first area, an image-taking device having a two-dimensional image-taking element that takes an image of the marker set, a recording device that records the coordinate of the acting portion with respect to the marker set, and a processing device that calculates the three-dimensional position of the acting portion by using the position and angle of the marker set determined on the basis of the image of the marker set taken by the image-taking device and the coordinate of the acting portion with respect to the marker set that is recorded in the recording device.

13 Claims, 9 Drawing Sheets

(SIDE VIEW)

(56) References Cited

U.S. PATENT DOCUMENTS

| | | | |
|---|---|---|---|
| 7,637,821 B2* | 12/2009 | Johnson | 473/202 |
| 2003/0063292 A1 | 4/2003 | Mostafavi | |
| 2004/0209698 A1* | 10/2004 | Ueda et al. | 473/150 |
| 2005/0201613 A1 | 9/2005 | Mostafavi | |
| 2006/0161363 A1* | 7/2006 | Shibasaki et al. | 702/94 |
| 2009/0082120 A1 | 3/2009 | Johnson | |

FOREIGN PATENT DOCUMENTS

| | | |
|---|---|---|
| JP | 2001-238894 A | 9/2001 |
| JP | 2003-035515 A | 2/2003 |
| JP | 2001-500775 A | 12/2005 |
| JP | 2005-537583 A | 12/2005 |
| JP | 2006-250918 A | 9/2006 |
| JP | 2007-061121 A | 3/2007 |
| JP | 2008-058204 A | 3/2008 |
| WO | 2004/094943 A1 | 11/2004 |

OTHER PUBLICATIONS

Chinese Office Action, dated Nov. 20, 2013, issued in corresponding Chinese Patent Application No. 201010002805.1.

* cited by examiner

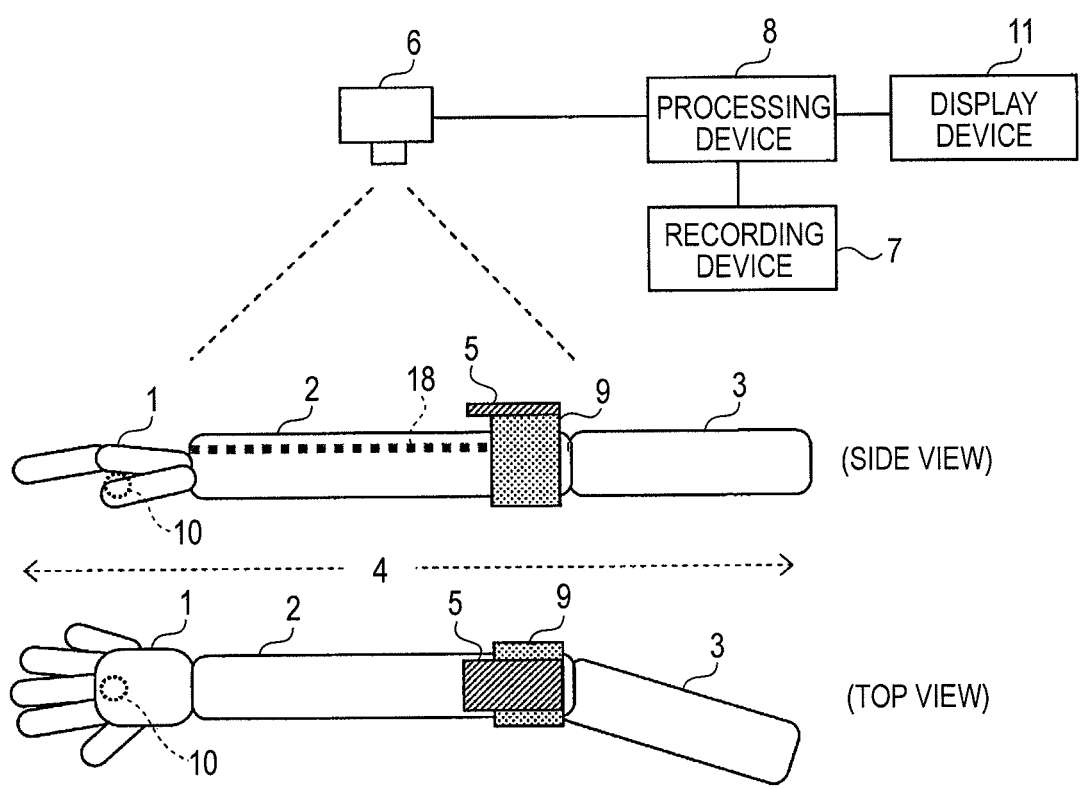

(SIDE VIEW)

(TOP VIEW)

(SIDE VIEW)

(TOP VIEW)

(SIDE VIEW)

(TOP VIEW)

(SIDE VIEW)

(TOP VIEW)

US 8,928,749 B2

POSITION MEASURING SYSTEM, PROCESSING DEVICE FOR POSITION MEASUREMENT, PROCESSING METHOD FOR POSITION MEASUREMENT, AND COMPUTER READABLE MEDIUM

CROSS-REFERENCE TO RELATED APPLICATION

This application is based on and claims priority under 35 USC 119 from Japanese Patent Application No. 2009 50361 filed Nov. 11, 2009 2009-150364 filed Jun. 24, 2009.

BACKGROUND

1. Technical Field

The present invention relates to a position measuring system, a processing device for position measurement, a processing method for position measurement, and a computer readable medium.

2. Related Art

Various techniques have been proposed as means for measuring the three-dimensional position of an object.

SUMMARY

According to an aspect of the present invention, there is provided a position measuring system including: a marker set having three or more basic markers that are known in positional relation and attached to a second area of an object which contains a first area having an acting portion and the second area continuous with the first area; an image-taking device having a two-dimensional image-taking element that takes an image of the marker set; a recording device that records the coordinate of the acting portion with respect to the marker set; and a processing device that calculates the three-dimensional position of the acting portion by using the position and angle of the marker set determined on the basis of the image of the marker set taken by the image-taking device and the coordinate of the acting portion with respect to the marker set that is recorded in the recording device.

BRIEF DESCRIPTION OF THE DRAWINGS

Exemplary embodiments of the present invention will be described in detail based on the following figures, wherein:

FIG. 1 is a diagram showing an exemplary embodiment of a position measuring system according to the present invention;

FIGS. 2A and 2B are diagrams showing a manner of securing a holding member for a marker set to a front arm, wherein FIG. 2A is a cross-sectional view of a main part in the longitudinal direction of the front arm and FIG. 2B is a cross-sectional view showing the main part in the lateral direction of the front arm;

DETAILED DESCRIPTION

Figure 2A:
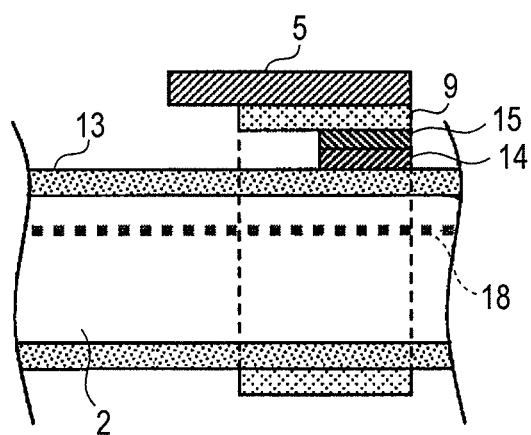

Exemplary embodiments according to the present invention will be described hereunder with reference to the accompanying drawings.

FIG. 1 is a diagram showing an exemplary embodiment of a position measuring system according to the present invention.

This exemplary embodiment will be described by taking human's hand and front arm for example. However, the present invention is not limited to this exemplary embodiment, and it may be applied to human's foot and lower leg, robot's hand and arm, an operating portion of a machine or a tool and a supporting portion for the operating portion or the like.

FIG. 1 shows an upper limb (object) 4 containing a human's hand (first area) having an acting portion 10 and a front arm (second area) 2 continuous with the hand 1. An upper arm 3 continuous with the front arm 2 is also contained in the upper limb 4. As shown in FIG. 1, the position measuring system according to this exemplary embodiment includes a marker set having three or more basic markers which are attached to the front arm 2 and have a certain positional relationship, an image-taking device 6 having a two-dimensional image-taking element for taking an image of the marker set 5, a recording device 7 for recording the coordinate of the acting portion with respect to the marker set 5, and a processing device 8 for calculating the three-dimensional position of the acting portion 10 by using the position and angle of the marker set 5 obtained on the basis of the image of the marker set 5 taken by the image-taking device 6 and the coordinate of the acting portion 10 with respect to the marker set 5 which is recorded in the recording device 7. The construction of the marker set 5 will be described later.

The marker set 5 is attached to a holding member 9 such as a belt or the like which can be detachably mounted on the front arm 2, however, it is not limited to this style. A personal computer (PC) may be used as the processing device 8, however, this invention is not limited to this style. The recording device 7 may be provided separately from the processing device 8, however, it may be contained in PC. The processing device 8 may be connected to a display device 11 for displaying a processing result of the processing device, etc.

In FIG. 1, the acting portion 10 means a grip position when an article is gripped by the hand 1, for example. However, the present invention is not limited to this style, and it may be another position associated with the grip position. The position at which the marker set 5 is attached to the front arm 2 is not limited to a specific position, however, it may be better that the marker set 5 is attached to a position nearer to the upper arm 3 than the center portion of the front arm 2 in the longitudinal direction thereof. This is because when the hand 1 is rotated around the longitudinal direction axis of the front arm 2, it makes the rotational motion be hardly transmitted to the marker set 5 attached to the front arm 2. It is desired that the marker set 5 is located on the radius 18 side of the front arm 2. This is because the marker set can be easily held within an image-taking range of the image-taking device 6 irrespective of the rotational motion of the hand.

As described above, according to this exemplary embodiment, an image of the marker set 5 is taken by the image-taking device 6, the position and angle of the marker set 5 are determined on the basis of the image concerned, and the three-dimensional position of the acting portion 10 can be measured by using the above values and the coordinate of the acting portion 10 with respect to the marker set 5 recorded in the recording device 7. In a case where the marker set 5 is attached to the back of the hand 1 to measure the position of the acting portion 10, the rotation of the hand 1 causes the marker set 5 to be likewise rotated, so that the marker set 5 gets out of the image-taking range of the image-taking device 6. However, in a case where the marker set 5 is attached to the front arm 2, even if the hand 1 is rotated, the rotation degree of the marker set 5 is less than that in the former case, so that the marker set 5 can be kept within the image-taking range of the image-taking device 6. Furthermore, when the marker set 5 is attached to the back of the hand 1, the marker set 5 gets out of the image-taking range of the image-taking device 6 if the hand 1 gets behind something during manual work. However, when the marker set 5 is attached to the front arm 2, the front arm 2 is not hidden even if the hand 1 gets behind something, so that the marker set 5 can be kept within the image-taking range of the image-taking device 6.

Figure 2B:
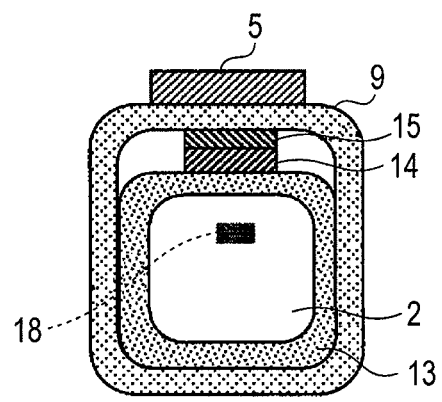

FIGS. 2A and 2B are diagrams showing an example of a manner of securing a holding member for the marker set to the front arm, wherein FIG. 2A is a cross-sectional view of a main part in the longitudinal direction of the front arm and FIG. 2B is a cross-sectional view of the main part in the lateral direction of the front arm. In this exemplary embodiment, a magnet 14 is attached to clothes 13 side covering the front arm 2, and a magnet 15 is attached to the holding member 9 side to which the marker set 5 is attached. When the holding member 9 approaches to the clothes 13, the magnet 14 and the magnet 15 are attached to each other, whereby the front arm 2 and the marker set 5 can be positioned with each other. In this case, one of the magnets 14 and 15 may be formed of a ferromagnetic material such as iron or the like. A freely stretchable ring-shaped member such as a belt, a rubber or the like which has hook-and-loop fasteners at both the ends thereof may be used as the holding member 9 so that the holding member 9 is detachably fixed to the front arm 2. The manner of securing the marker set 5 to the holding member 9 is not limited to a specific one, however, the marker set 5 may be attached to the holding member 9 by using adhesive agent, a magnet, a screw, an engagement structure, a hook-and-loop fastener or the like, for example.

Figure 3:
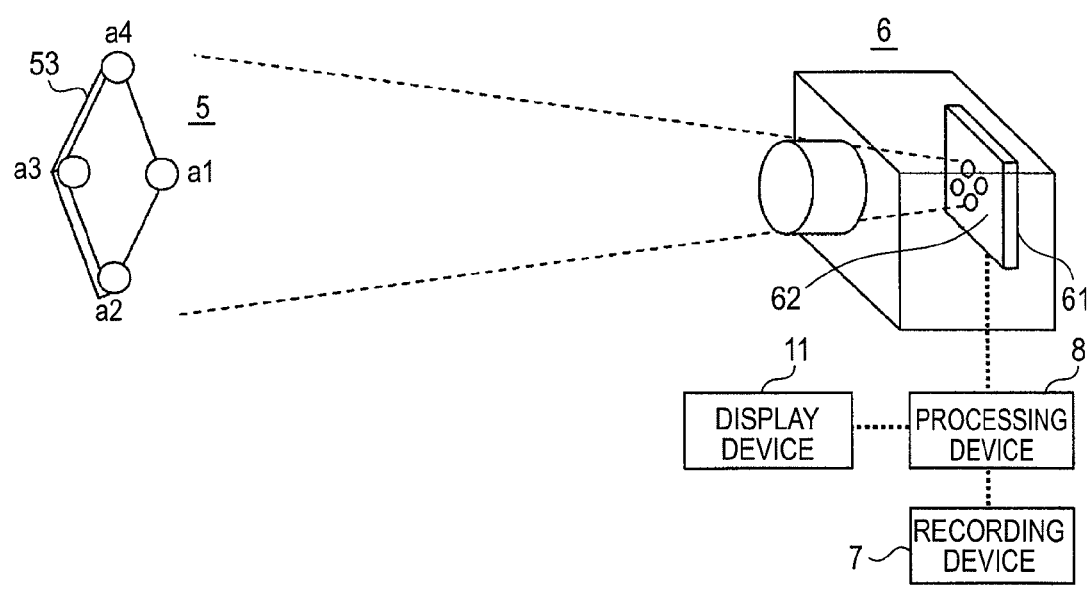
FIG. 3 is a diagram showing an example of the construction of the marker set and an example of an image-taking device for taking an image of the marker set.

FIG. 3 is a diagram showing an example of the construction of the marker set and an example of the image-taking device for taking an image of the marker set. As shown in FIG. 3, the marker set 5 has a board 53 such as a card or the like and four basic markers a1, a2, a3, a4 which are attached at the four corners of the board 53 and are known in positional relationship thereof. A light source such as LED or the like may be used as the basic marker, however, the present invention is not limited to this style. In place of the light source, a retroreflection plate may be used, and an illumination device for illuminating the retroreflection plate may be provided. Furthermore, a pattern image having a peculiar shape may be used. The image-taking device 6 has a two-dimensional image-taking element 61 for taking an image of the marker set 5, and a general-purpose digital camera may be used, for example. The position and angle of the marker set 5 are calculated by the processing device 8 on the basis of the image of the marker set 5 which is taken by the image-taking device 6. An example of the processing operation executed in the processing device 8 will be described.

Figure 4:
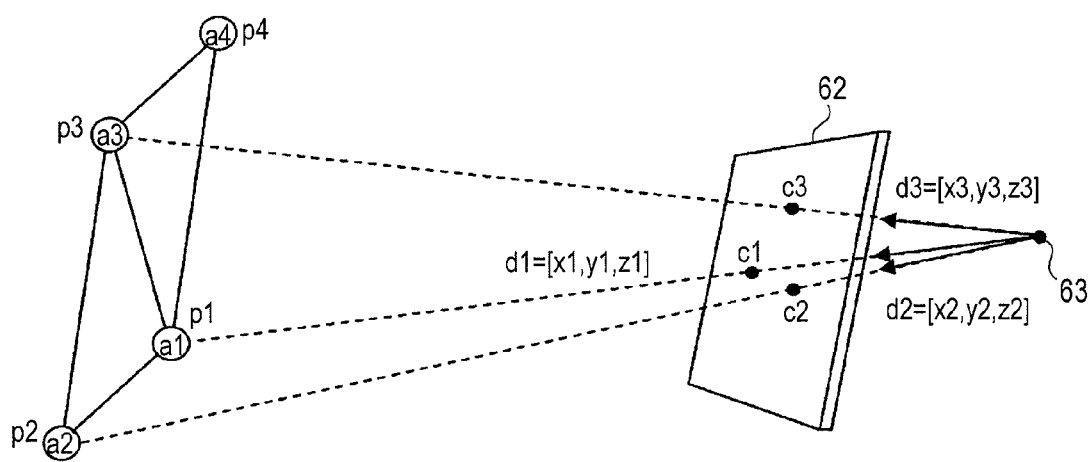
FIG. 4 is a diagram showing an example of a method of calculating the three-dimensional position of the marker set having three or more basic markers.

FIG. 4 is a diagram showing an example of a method of calculating the three-dimensional position of the marker set having three or more basic markers. In the following description, the basic marker will be described as a light source constructed by LED or the like. In this exemplary embodiment, four light sources are arranged at the corners of a square, for example, and two combinations each of which contains three light sources out of the four light sources are considered. Two solutions are derived from the following calculation by using the three points of each combination. With respect to one of the two solutions, the positions of all the light sources represent the same value and thus this solution is set as a correct solution, whereby the position and angle of the marker set can be determined.

First, in FIG. 4, direction vectors di (i=1, 2, 3) from the optical center 63 of the camera to the light source positions in the camera coordinate system are derived on the basis of the relation between the optical center 63 of the camera and each of the image positions c1, c2, c3 on an image plane (the two-dimensional image-taking element plane of the camera) 62 of the light sources (basic markers) a1, a2, a3. Here, di represents a normalized unit vector.

When the position vectors in the space of the light sources a1, a2, a3 are represented by p1, p2, p3, these position vectors exist on the extension lines of the direction vectors di, respectively. Therefore, when coefficients for these position vectors are represented by t1, t2, t3, the following expression can be obtained:

$$P1 = t1 \cdot d1, p2 = t2 \cdot d2, p3 = t3 \cdot d3 \quad \text{expression 1}$$

The shape of the triangle is known from the beginning, and thus when the lengths of the triangle are represented as follows (expressions 2):

$$p1p2 = L1$$

$$p2p3 = L2$$

$$p3p1 = L3 \quad \text{expression 2}$$

Furthermore, the following expressions are obtained. In the expression, "^" represents power.

$$(t1x1-t2x2)^2 + (t1y1-t2y2)^2 + (t1z1-t2z2)^2 = L1^2$$

$$(t2x2-t3x3)^2 + (t2y2-t3y3)^2 + (t2z2-t3z3)^2 = L2^2$$

$$(t3x3-t1x1)^2 + (t3y3-t1y1)^2 + (t3z3-t1z1)^2 = L3^2 \quad \text{Expression 3}$$

By putting the expression 3 in order, the following expression 4 is obtained.

$$t1^2 - 2t1t2(x1x2+y1y2+z1z2) + t2^2 - L1^2 = 0$$

$$t2^2 - 2t2t3(x2x3+y2y3+z2z3) + t3^2 - L2^2 = 0$$

$$t3^2 - 2t3t1(x3x1+y3y1+z3z1) + t1^2 - L3^2 = 0 \quad \text{expression 4}$$

Further, the following expression 5 is obtained. In the expression, "sqrt" represents square root.

$$t1 = A1 \cdot t2 \pm sqrt((A1^2-1) \cdot t2^2 + L1^2)$$

$$t2 = A2 \cdot t3 \pm sqrt((A2^2-1) \cdot t3^2 + L2^2)$$

$$t3 = A3 \cdot t1 \pm sqrt((A3^2-1) \cdot t1^2 + L3^2) \qquad \text{expression 5}$$

Here, A1, A2, A3 are represented in the following equation 6.

$$A1 = x1x2 + y1y2 + z1z2$$

$$A2 = x2x3 + y2y3 + z2z3$$

$$A3 = x3x1 + y3y1 + z3z1 \qquad \text{expression 6}$$

Since a real-number solution exists, the inside of the square roots of the expression 5 is positive, and thus the following expression 7 is obtained:

$$t1 \le sqrt(L3^2/(1-A3^2))$$

$$t2 \le sqrt(L1^2/(1-A1^2))$$

$$t3 \le sqrt(L2^2/(1-A2^2)) \qquad \text{expression 7}$$

The real numbers t1, t2 and t3 which satisfy this condition are successively substituted into the expression 5, and all of the values t1, t2 and t3 with which the expression 5 is satisfied are calculated. Subsequently, p1, p2, and p3, that is, the three-dimensional positions of the light sources (basic markers) are calculated from the above expression 1. In the case of three light sources, two solutions are obtained. In this exemplary embodiment, the four light sources are provided, and thus the same calculation is executed on the other combinations of three light sources (basic markers), for example, the combination of a1, a3 and a4, etc. to thereby derive two solutions for each combination. With respect to one of the two solutions, all the light source positions represent the same value, and thus this solution is selected as a correction solution. As described above, the position of the marker set can be determined. In the case of the three light sources, for example, the average value of the two solutions or one solution which is nearer to a known initial value may be selected as a solution to be calculated. The angle of the marker set can be determined as the direction to the marker set on the basis of the three-dimensional position determined above.

Furthermore, the three-dimensional coordinate (X1, Y1, Z1) (offset coordinate) of the acting portion 10 with respect to the marker set 5 is recorded in the recording device 7. The processing device 8 calculates the three-dimensional position of the acting portion 10 by using the three-dimensional coordinate (X1,Y1, Z1) of the acting portion 10 with respect to the marker set 5 and the above calculated three-dimensional position and angle of the marker set. A manner of calculating the coordinate (X1, Y1, Z1) of the acting portion 10 with respect to the market set 5 will be described later. The calculation method of the three-dimensional position of the basic marker (light source) is not limited to the above method, and it may be another method.

Figure 5:
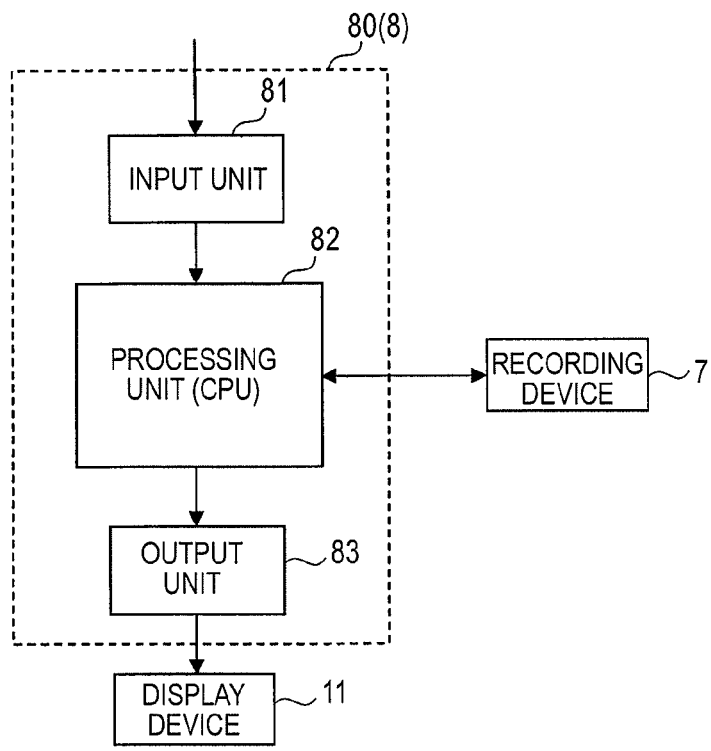
FIG. 5 is a block diagram showing an example of a processing device for position measurement when a personal computer (PC) is used as the processing device.

FIG. 5 is a block diagram showing an example of a processing device for position measurement when a personal computer (PC) is used as the processing device for position measurement. In this exemplary embodiment, the processing device 8 for position measurement is constructed as PC 80, and it is equipped with an input unit 81 for inputting an image of the marker set 5 which is taken by the two-dimensional image-taking element 61 of the image-taking device 6, a central processing unit (CPU) 82 for calculating at least one of the three-dimensional position and angle of the marker set 5 on the basis of the input image, and an output unit 83 for outputting at least one of the calculated three-dimensional position and angle of the marker set 5 to the display device 11 such as a monitor. The recording device 7 is connected to PC 80, and information are received/delivered between them. The recording device 7 records the coordinate (X1,Y1, Z1) of the acting portion 10 with respect to the marker set 5, however, it may also record programs to be executed in PC 80 and various kinds of information used in PC 80. The recording device 7 is constructed as a device connected to the outside of PC 80 in this exemplary embodiment, however, it may be constructed as an internal device (memory) of PC 80.

Figure 6:
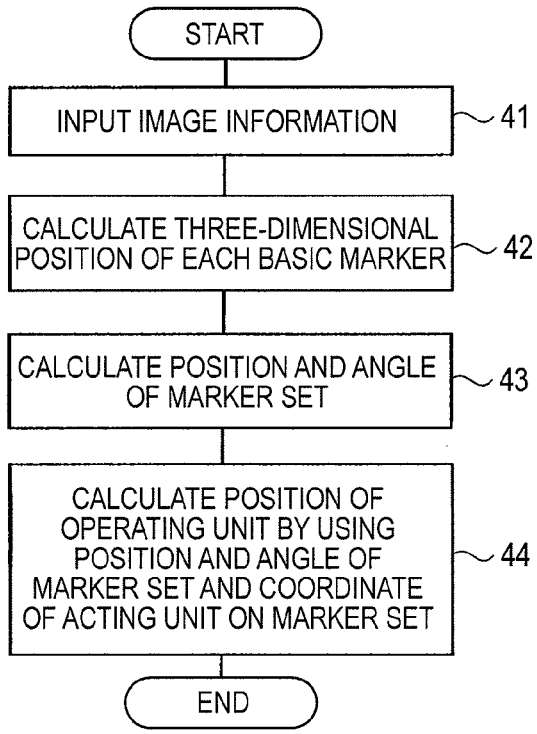
FIG. 6 is a flowchart showing an example of the processing executed in the processing device for position measurement.

FIG. 6 is a flowchart showing an example of the processing executed in the processing device for position measurement. The processing of this exemplary embodiment is executed according to the above description made with reference to FIG. 4. First, image information of the marker set 5 which is taken by the image-taking device is input in step 41. Subsequently, the three-dimensional position of each basic marker is calculated on the basis of the image information of the marker set 5 in step 42. In step 43, the position and angle of the marker set 5 are calculated based on the three-dimensional position of each basic marker. In step 44, the three-dimensional position of the acting portion 10 is calculated by using the position and angle of the marker set 5 and the coordinate of the acting portion 10 with respect to the marker set 5.

Figure 7A:
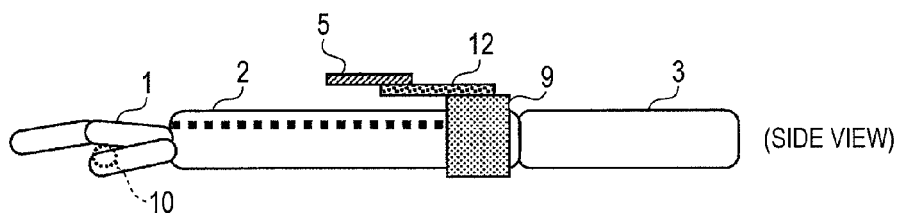
FIGS. 7A and B are side views and top views showing another example of the manner of securing the marker set to the holding member.
Figure 7B:
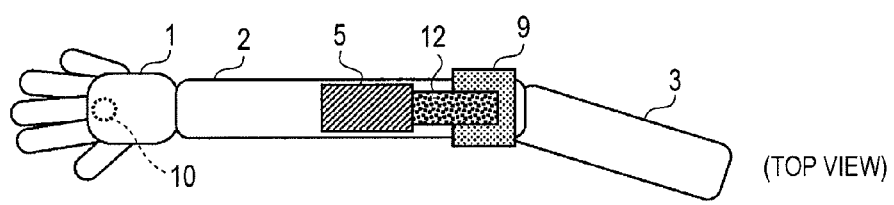

FIGS. 7A and 7B are side view and top view showing another example of the manner of securing the marker set to the holding member. In this exemplary embodiment, the marker set 5 is attached to the holding member 9 through a support member 12 overhanging in the longitudinal direction of the hand 1. Accordingly, the basic marker disposed in the marker set 5 can be prevented from being interrupted by a head or a cap when the marker set 5 is viewed from the image-taking device 6.

Figure 8A:
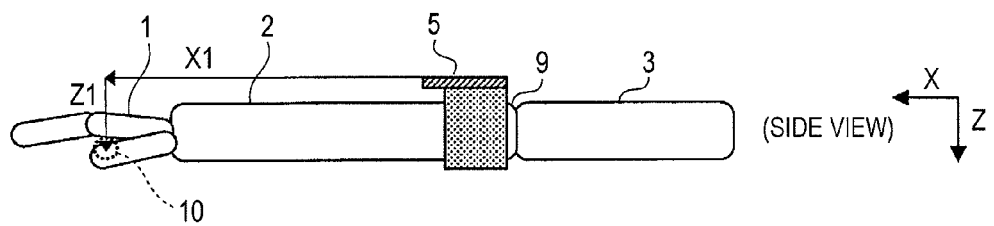
FIGS. 8A and 8B are side view and top view showing the coordinate of an acting portion on the marker set.
Figure 8B:
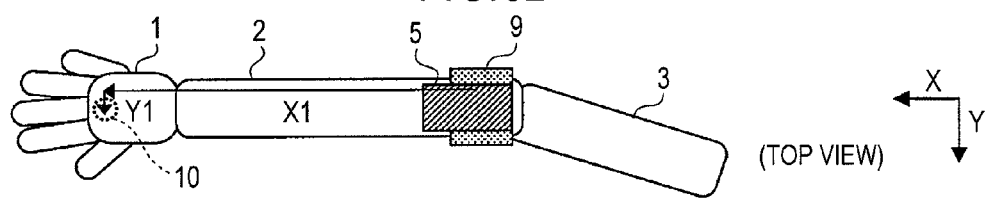

FIGS. 8A and 8B are side view and top view showing the coordinate of the acting portion with respect to the marker set. As described above, the acting portion 10 corresponds to a grip position where an article is gripped by the hand 1, for example. The method of calculating the acting portion (grip position) 10 with respect to the marker set 5 will be described. As described above, the position and angle of the marker set 5 can be determined by the image-taking device (camera) 6 as described above. Not only the coordinate of the reference point of the marker set 5, but also the coordinates of the four corners of the marker set 5 can be calculated. Furthermore, the position of the tip of the marker set 5 when the marker set 5 extends in a specific direction can be also calculated. The coordinate system which is viewed from the marker set 5 as described above will be referred to as "marker set coordinate system". In order to discriminate from this system, the coordinate which is viewed from the camera will be referred to as "camera coordinate". Here, the marker set 5 is mounted at the upper-arm side base portion of the front arm 2, and the acting portion 10 is determined as the coordinate (X1, Y1, Z1) in the marker set coordinate system. In this case, as shown in FIGS. 8A and 8B, it is difficult and inaccurate to measure the displacement in the three-dimensional X, Y, Z directions of the acting portion 10 on the palm of the hand with respect to the marker set 5 mounted on the upper-arm side base portion of the front arm 2 by using a scale or the like. Therefore, a method of calculating and determining the coordinate of the acting portion with respect to the marker set will be described hereunder.

Figure 9A:
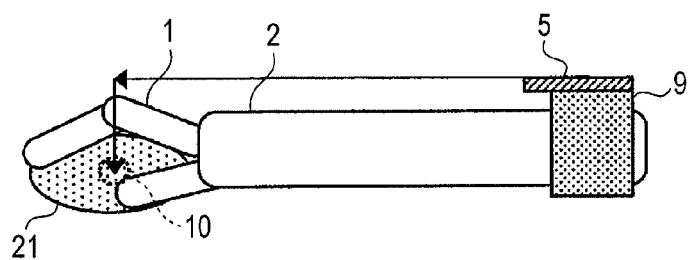
FIGS. 9A and 9B are diagrams showing an example of a method of determining the coordinate of the acting portion on the marker set.
Figure 9B:
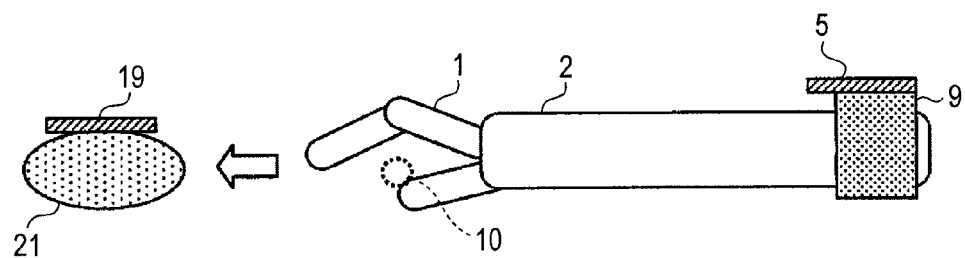

FIGS. 9A and 9B are diagrams showing an example of a manner of determining the coordinate of the acting portion with respect to the marker set. In this exemplary embodiment, a grip position indicating jig (hereinafter referred to as "auxiliary tool") 21 which is fixed on the camera coordinate system and known in coordinate is grabbed, thereby knowing the relative position between the marker set 5 and the auxiliary tool 21. A value obtained by calculating this relative position in terms of the marker set coordinate system corresponds to the three-dimensional coordinate (X1, Y1, Z1) described above. The auxiliary tool 21 of this exemplary embodiment has such a mouse-like shape that it can be grabbed, however, the present invention is not limited to this shape. In order to known the position of the auxiliary tool 21, the auxiliary tool 21 can be disposed at the position which has been already determined as shown in FIG. 9A. In this case, the coordinate of the acting portion with respect to the marker set is calculated by using the three-dimensional position and angle of the marker set determined on the basis of the image of the marker set which is taken by the image-taking device when the acting portion 10 is disposed at the position of the auxiliary tool 21 which has been already known. Or, as shown in FIG. 9B, another marker set 19 is attached to the auxiliary tool 21 to measure the position of the auxiliary tool 21. In this case, the coordinate of the acting portion with respect to the marker set is calculated by using the three-dimensional positions and angles of both the marker sets which are determined on the basis of the image of the marker set 5 attached to the front arm 2, which is taken by the image-taking device when the acting portion 10 is disposed at the position of the auxiliary tool 21 to which the marker set having the three or more basic markers known in positional relation thereamong is attached, and the image of the marker set 19 attached to the auxiliary tool 21 which is taken by the image-taking device.

The purpose of the auxiliary tool 21 resides in that a freely movable hand (finger or wrist) is disposed on the auxiliary tool to thereby read out an offset amount from the marker set more accurately. Therefore, various styles may be considered for the auxiliary tool.

Figure 10:
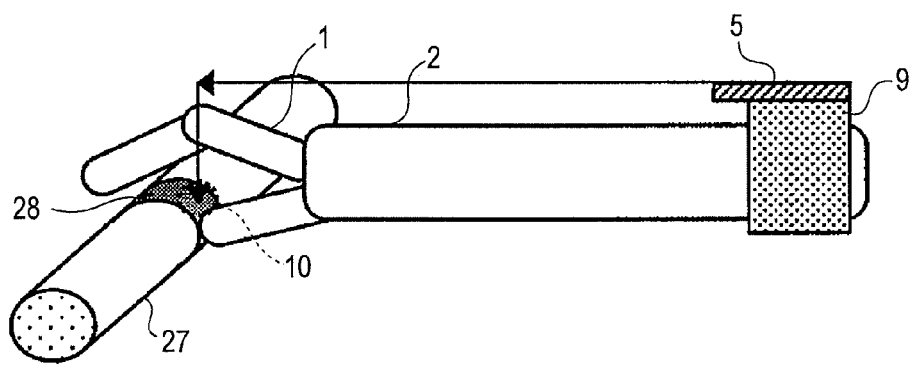
FIG. 10 is a diagram showing another example of an auxiliary tool.

FIG. 10 is a diagram showing another example of the auxiliary tool. In this example, a colored or patterned grip portion 28 is provided at some midpoint in the longitudinal direction of a rod-shaped auxiliary tool 27. When the position of the grip portion 28 is known, the acting portion 10 can be disposed at the known position by grabbing the grip portion 28 with the hand 1. When the position of the grip portion 28 is not known, the marker set 19 shown in FIG. 9B is attached to the grip portion 28, and the position of the grip portion can be measured by using the image-taking device 6. Accordingly, the coordinate of the acting portion with respect to the marker set can be calculated as in the case of FIG. 9. The start of the calculation of the grip position (acting portion) is executed by using a switch attached to the auxiliary tool or by executing a switching operation with a hand or a foot at which the grip position calculation is not executed. The operation is finished within about two seconds in order to obtain a predetermined number of measurements (to obtain an average value of about one hundred measurements), and the end of the measurement is notified by screen display, sound (containing voice) or vibration of the auxiliary tool. The switching operation may be executed in a cabled style or in a wireless style (containing wireless mouse).

Figure 11A:
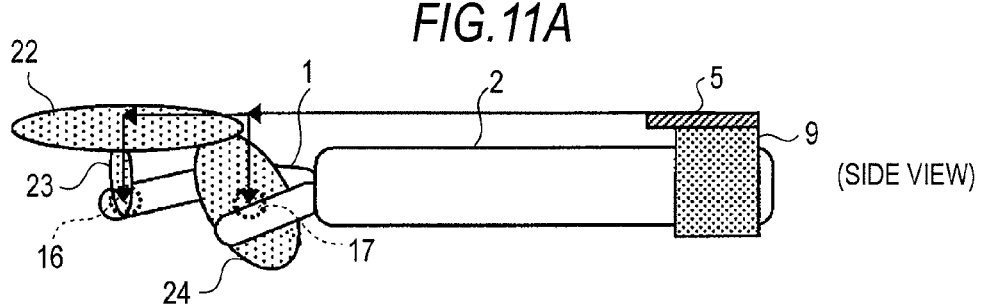
FIGS. 11A and 11B are side view and top view of another example of the auxiliary tool.
Figure 11B:
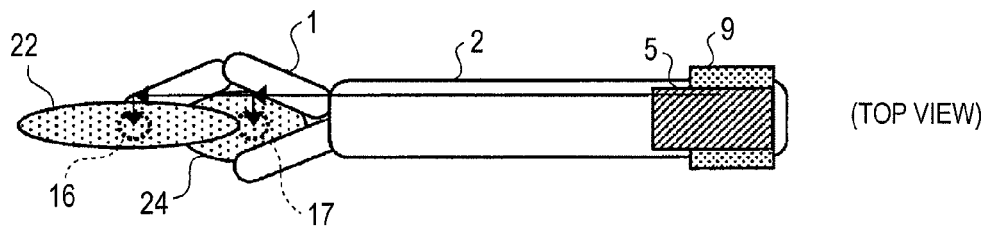

FIGS. 11A and B are side and top views of another example of the auxiliary tool.

Any auxiliary tool 22 of this example is designed in such a grasping shape like a pistol, however, the present invention is not limited to this style. When the auxiliary tool 22 is designed like a pistol, the position of a trigger 23 may be regarded as a position when a small part is gripped (acting portion 16) and the position of a holding portion 24 may be regarded as a position when a large article is gripped (acting portion 17). In this case, the coordinates of the acting portions 16 and 17 with respect to the marker set 5 can be also calculated in the same manner as described above.

Figure 12A:
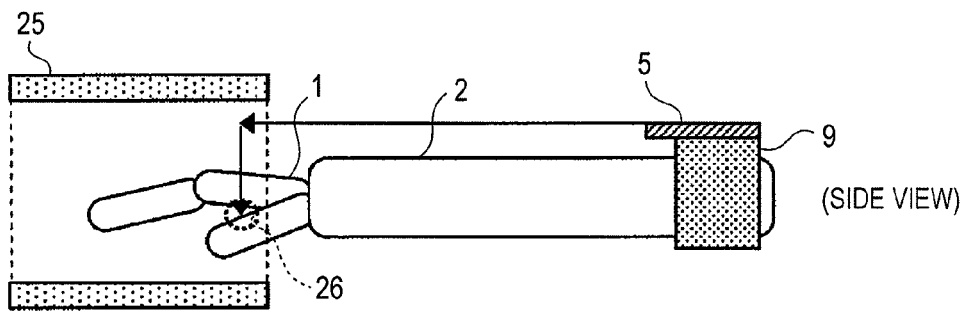
FIGS. 12A and 12B are side view and top view showing another example of the auxiliary tool.
Figure 12B:
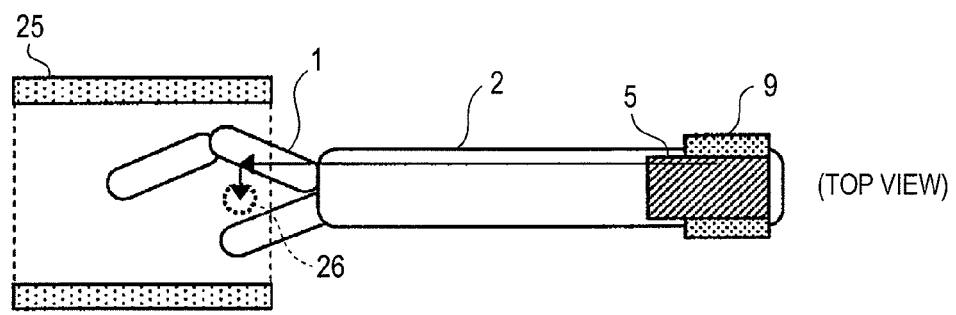

FIGS. 12A and 12B are side and top views of another example of the auxiliary tool.

Any auxiliary tool 25 of this example has partition plates having some width which are arranged at the right and left sides and at upper and lower sides. A hand (finger) is put into the space surrounded by the partition plates to restrict the grip position within some range. Accordingly, a specific position of the space surrounded by the partition plates is indicated as a grip position (acting portion 26), whereby the coordinate (X1, Y1, Z1) from the marker set to the grip position can be calculated in the same method as described above. The grip position (acting portion) does not necessarily correspond to a position at which an object is actually gripped, and it may be inside or outside the auxiliary tool (partition plates) 25 because it is an object of the present invention to determine a position in the neighborhood of the palm of the hand at a certain level of fixed distance irrespective of the motion of a finger or wrist which has a high degree of freedom. Furthermore, the auxiliary tool 25 is not the partition plate, but may have a cylindrical body.

Figure 13:
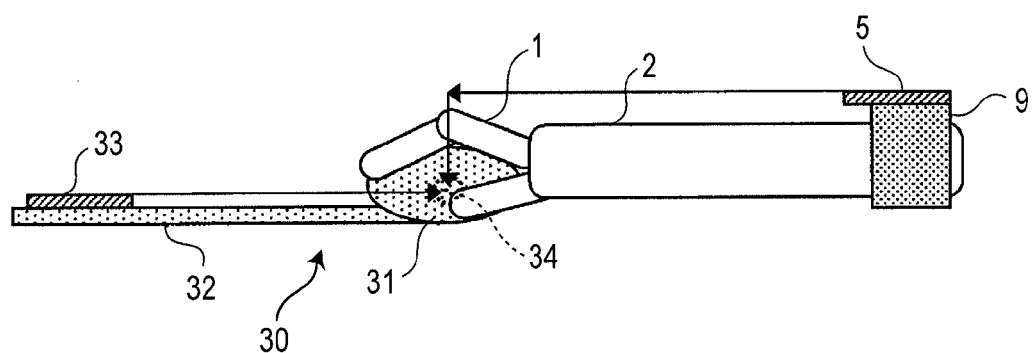
FIG. 13 is a diagram showing another example of the auxiliary tool.

FIG. 13 is a diagram showing another example of the auxiliary tool. In an auxiliary tool 30 of this example, a plate-shaped or rod-shaped member 32 is extended from the auxiliary tool main body 31 as shown in FIG. 13, and a marker set 33 is fixed to the tip of the member 32. A correction value (offset value) is preset to the three-dimensional position of the marker set 33 so that it corresponds to the position of an acting portion (grip position) 34 shown in FIG. 13. Initially, the three-dimensional position of the marker set 5 does not contain any correction value, and directly corresponds to the position of the marker set 5. Here, as shown in FIG. 13, the auxiliary tool main body 31 is gripped in the opposite direction to the marker set 33 by the palm of the hand, whereby the correction value is given to the marker set 5 and the position of the acting portion 34 is calculated. It is preferable that the marker set 33 is fixed so as to be spaced from the acting portion 34 by a distance of about 10 cm or more so that the marker set 33 is not hidden by the hand 1 when viewed from the image-taking device (camera).

Next, the correction of the grip position (acting portion) will be described. In this exemplary embodiment, the work is executed while the marker set 5 is attached to the front arm 2. Therefore, during the work, the position of the acting portion 10 may be displaced from the initially-recorded three-dimensional coordinate (offset coordinate) of the acting portion 10 with respect to the marker set 5. In order to correct this displacement, it is desired that the calculation of the coordinate of the acting portion 10 described above is executed again at the start time of the work or during the work, and the position of the acting portion 10 is calculated by using a new three-dimensional coordinate (X1, Y1, Z1). In this case, the calculation of the coordinate of the acting portion 10 with respect to the marker set 5 is executed at a predetermined time point, and the value thus calculated is recorded as the coordinate of the acting portion 10 with respect to the marker set 5 into the recording device 7. Furthermore, it is desired to provide a display unit for indicating that the correction as described above should be made when a fixed time elapses or at a breakpoint of the work. That is, the display unit displays an indication for executing the calculation of the coordinate of the acting portion 10 with respect to the marker set 5 at a predetermined time point. The indication of this case may be performed by providing a dedicated display unit for emitting light, sound or the like. In place of use of this display unit, a character, a figure or the like may be displayed on the display device 11 such as the monitor or the like, or an indication sound may be output from PC. The calculation of the coordinate (offset coordinate) of the acting portion with respect to the marker set may be started when an indicator such as a switch or the like is added to the auxiliary tool and the indicator is operated, or when it is recognized from the position of the marker set 5 through the image-taking device 6 that a hand approaches to the auxiliary tool and the shift amount of the marker set is reduced to a specific value or less.

The calculation of the position of the acting portion described above may be executed by making a computer execute the following program. That is, this program makes the computer execute the following three procedures. The computer is made to execute a first procedure of determining the position and angle of a marker set having three or more basic markers that are known in positional relation and attached to a second area of an object which contains a first area having an acting portion and the second area continuous with the first area. The position and angle of the marker set are determined on the basis of an image of the marker set which is taken by an image-taking device having a two-dimensional image-taking element. The computer is made to execute a second procedure of reading out of the coordinate of the acting portion with respect to the marker set which is recorded in the recording device. Furthermore, the computer is made to execute a third procedure of calculating the three-dimensional position of the acting portion by using the calculated position and angle of the marker set and the read-out coordinate of the acting portion with respect to the marker set. In the above exemplary embodiment, the program is stored in the external recording device of PC. However, this program may be stored in an internal memory of PC or supplied through a network by a communication unit.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the skilled in the art to understand the invention for various embodiments and with the various modifications as are suited to the particular use contemplated. It is intended that the scope of the invention be defined by the following claims and their equivalents.

What is claimed is:

1. A position measuring system comprising:
   a first marker set having three or more markers that have certain positional relationship and being attached to a second area of an object which contains a first area having an acting portion and the second area continuous with the first area;
   an image-taking device having a two-dimensional image-taking element that takes a first image including a position of the first marker set and a position of an auxiliary tool in a state that the acting portion is disposed at the position of the auxiliary tool;
   a processing device that calculates coordinate of the acting portion based on the first image, an origin of the coordinate of the acting portion being a position of first marker set; and
   a recording device that records the coordinate of the acting portion calculated by the processing device;
   wherein
   the image-taking device takes a second image including the first marker in a state that the acting portion is not disposed at a position of the auxiliary tool, and
   the processing device calculates three-dimensional position of the acting portion by using position and angle of the first marker set determined on the basis of the second image and the coordinate of the acting portion previously recorded in the recording device.

2. The position measuring system according to claim 1, wherein the first marker set is attached to a holding member that is detachably mounted on the second area.

3. The position measuring system according to claim 2, wherein the first marker set is attached to the holding member through a support member overhanging in the direction of the first area.

4. The position measuring system according to claim 1, wherein the calculation of the coordinate of the acting portion with respect to the first marker set is executed at a certain time point, and the calculated value is recorded as the coordinate of the acting portion with respect to the first marker set into the recording device.

5. The position measuring system according to claim 1, further comprising a display that displays an indication for executing the calculation of the coordinate of the acting portion with respect to the first marker set at a certain time point.

6. The position measuring system according to claim 1, wherein the auxiliary tool has an indicator that indicates start of the calculation of the coordinate of the acting portion with respect to the first marker set.

7. A processing method for position measurement, comprising:
   determining position and angle of a first marker set having three or more markers which have certain positional relationship and are attached to a second area of an object including a first area having an acting portion and the second area continuous with the first area, the determination is performed on the basis of a first image including a position of the first marker set and a position of an auxiliary tool in a state that the acting portion is disposed at the position of the auxiliary tool; and the first image provided from an image-taking device having a two-dimensional image-taking element;
   calculating coordinate of the acting portion based on the first image, an origin of the coordinate of the acting portion being a position of first marker set;
   recording the calculate coordinate;
   taking a second image including the first marker in a state that the acting portion is not disposed at a position of the auxiliary tool; and
   calculating three-dimensional position of the acting portion by using the determined position and angle of the first marker set determined on the basis of the second image and the coordinate of the acting portion previously recorded.

8. The position measuring system according to claim 1, wherein the auxiliary tool has a gripping portion and a second marker set, and
   wherein the coordinate of the acting portion is calculated by also using the position of the second marker set when the hand grips the gripping portion.

9. The position measuring system according to claim 1, wherein the auxiliary tool has a gripping portion having a colored or patterned grip.

10. The position measuring system according to claim 1, wherein the auxiliary tool has a shape including a trigger portion and a holding portion, the trigger portion being smaller than the holding portion.

11. The position measuring system according to claim 1, wherein the auxiliary tool has a plate shape or a rod shape.

12. The position measuring system according to claim 11, wherein the auxiliary tool has a second marker set disposed on an end of the plate shape or rod shape and the auxiliary tool is gripped by the hand on an opposite end of the plate shape or rod shape from the second marker set.

13. The position measuring system according to claim 1, wherein the coordinate of the acting portion with respect to the first marker set is based on a first coordinate system which is viewed from the first marker set, and the three-dimensional position of the acting portion is based on a second coordinate system which is viewed from the image-taking device.

* * * * *